US006890681B2

(12) United States Patent
Mittal et al.

(10) Patent No.: US 6,890,681 B2
(45) Date of Patent: May 10, 2005

(54) LEAK RESISTANT AUTOMOTIVE BATTERY

(75) Inventors: Surendra Kumar Mittal, Calcutta (IN); Debashish Mazumdar, Calcutta (IN); Partha Dasgupta, Calcutta (IN)

(73) Assignees: Exide Industries Ltd., Calcutta (IN); Shin-Kobe Electric Machinery Co., Ltd., Tokyo (JP)

( * ) Notice: Subject to any disclaimer, the term of this patent is extended or adjusted under 35 U.S.C. 154(b) by 336 days.

(21) Appl. No.: 10/193,614

(22) Filed: Jul. 11, 2002

(65) Prior Publication Data
US 2003/0017381 A1 Jan. 23, 2003

(30) Foreign Application Priority Data
Jul. 23, 2001 (JP) ........................................ 2001-221418

(51) Int. Cl.[7] .......................... H01M 2/04; H01M 2/12; H01M 2/36
(52) U.S. Cl. ............................. 429/89; 429/78; 429/84; 429/87
(58) Field of Search .............................. 429/78, 82, 84, 429/87–89, 175, 178, 185

(56) References Cited

U.S. PATENT DOCUMENTS

| 3,860,453 A | 1/1975 | Schmidt ................. 136/177 |
| 4,348,466 A | 9/1982 | Elehew et al. ............. 429/84 |
| 5,380,604 A | 1/1995 | Hampe et al. ............. 429/84 |
| 5,422,199 A * | 6/1995 | Adams et al. ............. 429/88 |
| 5,424,146 A | 6/1995 | Lin ...................... 429/84 |
| 5,683,830 A | 11/1997 | Fritts et al. ............. 429/84 |
| 5,843,593 A | 12/1998 | Fritts et al. ............. 429/84 |

FOREIGN PATENT DOCUMENTS

| DE | 3 444 011 | 5/1986 | ........... H01M/2/12 |
| DE | 3729610 A * | 3/1989 | ........... H01M/2/04 |
| DE | 42 16 563 | 11/1993 | ........... H01M/2/12 |
| EP | 0639862 | 5/1994 | .......... H01M/10/48 |
| JP | 08102310 | 4/1996 | ........... H01M/2/12 |

* cited by examiner

Primary Examiner—Gregg Cantelmo
(74) Attorney, Agent, or Firm—Pearne & Gordon LLP

(57) ABSTRACT

A leak resistant automotive battery comprising a housing containing cells having filling plugs; a battery cover sealed to an opened top end of the housing and having filling holes overlying the respective cells; at least one partition wall provided in the battery cover to divide the battery cover into at least two vent chambers, each vent chamber overlying a set of the cells, to prevent flow of electrolyte from one set of cells to an adjacent set of cells when the battery is tilted; a common vent line in the battery cover connecting the spaces above the cells in each set of cells, each of the common vent line being sealed at one end and connected at its other end through a vent chamber to one end of each of parallel vent lines having at its other end a vent cap assembly which permits escape of vented gases from the cells in each set.

20 Claims, 12 Drawing Sheets

DIRECTION OF TILT →

LEAK RESISTANT AUTOMOTIVE BATTERY

TECHNICAL FIELD OF THE INVENTION

This invention relates to an automotive battery and more particularly to a leak resistant automotive battery.

BACKGROUND OF THE INVENTION

One of the major technological innovations in the last two decades or so has been the development of maintenance-free battery for automotive applications and this technology is now widely used in the battery industry world-wide.

However, since most of the automotive batteries contain free electrolyte, the hazards of acid leaks still persist particularly during battery handling, transportation and charging. Acid spillage or leakages are most undesirable, for they can cause burns, corrosion of battery terminals and the related electrical systems in the automobile. As a result, there is a definite preference in the market place for a safe, leak-proof battery, which can be handled more easily without posing any hazard. In view of this, a small percentage of automotive batteries are being converted to leak-proof, valve regulated type assembled with AGM (Absorptive Glass Mat) separators, especially for the premium range of vehicles.

However, valve regulated automotive batteries are substantially more expensive to manufacture. Furthermore, the flooded battery designs are known to have certain technical advantages in comparison to the acid-starved, VTLA (Valve Regulated Lead Acid) designs. In spite of substantial cost penalties as well as certain technical limitations, the trend appears to be towards valve regulated type due mainly to the need for a safe, leak-proof maintenance-free battery. For example, most of the future designs for a 36V automotive battery are of VRLA type assembled with AGM separators.

It is clear from the above that further technical developments are required to make leak-proof or leak-resistant automotive batteries of flooded variety. These designs are still predominantly used all over the world primarily due to their lower cost as well as the ease of manufacturing.

Hitherto, there have been many attempts to develop a leak-resistant automotive battery with free electrolyte using a specially designed battery cover.

In this context, some of the important innovations, which have taken place in the last 20 years, are being discussed as hereinbelow.

U.S. Pat. No. 4,348,466 published on Sep. 7, 1982 (assigned to Varta Battery Ltd., Willowdale, Calif.) discloses an anti-spill arrangement for a liquid electrolyte battery which comprises a large rectangular chamber with an inlet in communication with a respective battery cell and an outlet in communication with a vent to the atmosphere. The chamber and the associated passages have sufficient volume to retain the electrolyte flows when the battery is tipped or rotated. Furthermore, the chamber arrangement is such that the level of the contained electrolyte remains spaced from the outlet.

When the chamber and the passages are filled with electrolyte, an air lock is developed which prevents additional flow of electrolyte from the cell to the chamber and the passage configuration. The notable point in this patent is that large chambers and passage configuration allow substantial amount of electrolyte to flow into the battery cover and thereby increase the likelihood of electrolyte spilling into the venting area, ultimately causing leakage of the electrolyte from the battery system, especially if the battery is vibrated or agitated. Furthermore, this patent does not provide leak protection in the inverted position of the battery.

German patent No. 4,216,563 published on Nov. 24, 1993 (assigned to VB Autobatterie GmbH) discloses a double-cover type construction having a chamber associated with each cell. Each chamber is properly sized such that when the battery is tilted, only a limited amount of acid from the respective cell enters the collection chamber which the chamber can contains. In the inverted position, however, a substantial amount of electrolyte flows out from the cells into the cover, thus increasing the risk of electrolyte leaking from the battery.

In U.S. Pat. No. 5,380,604 to Hampe et al. (issued on Jan. 10, 1995) and U.S. Pat. No. 5,424,146 to Lin (issued on Jun. 13, 1995), similar configurations have been seen.

The leak-resistant battery cover comprises two parts, i.e. an upper lid and a lower lid, having chamber associated with each cell. Each chamber has guides for controlling the flow of acid. The guides are so designed that in any position of the housing, when resting on one of the side walls, acid within the chambers remains below the critical level, above which acid flows into a spark arrestor.

However, a significant amount of electrolyte is allowed to flow into the respective cover, which increases the possibility of acid leakage when the battery is vibrated or agitated. Also, there is little or no protection against electrolyte leakage when the battery is inverted.

U.S. Pat. No. 5,683,830 issued on Nov. 4, 1997 and U.S. Pat. No. 5,843,593 issued on Dec. 1, 1998 (assigned to Douglas Battery Manufacturing Company, U.S.A) disclose a leak resistant battery cover having two parts. The battery cover provides a labyrinth of passages forming a path from each cell vent to the atmospheric vent. The labyrinth provides a portion of each path above a level which the electrolyte attains when the battery is tilted or rotated 90° from an upright position.

European Patent No. EP 0 639 862 B1 published on Sep. 18, 1996 (assigned to VB Autobatterie GmbH) discloses a multi-cell battery having a central gas venting system integrated with the battery cover and incorporating a gas collecting duct and providing in the side wall of the cover a depression which is connected by a side duct to the collecting duct and an insert is provided in the depression. The insert contains a porous frit closing the gas duct, which is connected to the cover in an air-tight manner. The frit is so arranged in the insert that its lower edge is always above the level of the acid return flow.

The aforementioned Patents are generally based on relatively complex configuration of a battery cover, which comprises two parts, i.e. an upper lid and a lower lid and the upper lid is then sealed with the main cover either ultrasonically or by heat sealing. These designs of battery are relatively expensive and more complex at the manufacturing stage. Clearly, there is a need for a simple, leak resistant cover without having any adverse effect on its cost competitiveness.

SUMMARY OF THE INVENTION

Accordingly, it is a principal object of the invention to provide an automotive battery leak resistant in all directions for a substantial length of time, i.e. when the battery is rotated at 90° on the front face, the back face, either of the sides faces or in a completely inverted position starting from a normal upright position.

In accordance with one aspect of the invention, there is provided a leak resistant automotive battery comprising a housing containing cells each having a filling plug, a battery cover fitted to the housing at its opened top in a liquid tight manner and having filling holes overlying the cells, respectively and a pair of terminals mounted on the battery cover and connected to the cells; characterized by further comprising vent line blockage means to divide the battery cover into at least two vent chambers corresponding to two sets of the cells so that electrolyte is prevented from flowing from one of the two sets of the cells to the other set of the cells when the battery is tilted; a common vent line provided in the battery cover to connect the spaces above the cells for each sets of the cells to each other for every set of the cells, and a parallel vent line provided in the battery cover for each of the two sets of the cells separately from the common vent line, one end of the common vent line being closed while the other end of the common vent line is connected through the corresponding vent chamber to one end of the parallel vent line and the parallel vent line at the other end having a vent cap assembly to permit escape of vented gas from the cells of each set.

In the first feature of the invention, the vent line blockage means may preferably comprise a partition wall is provided in the battery cover to divide the battery cover into at least two vent chambers, each vent chamber overlying a set of the cells to prevent electrolyte from flowing from one of the sets of the cells to the other set of cells when the battery is tilted.

In accordance with another aspect of the invention, there is provided a leak resistant automotive battery comprising a housing containing cells each having a filling plug, a battery cover heat-sealed to an opened top end of the housing and having filling holes overlying the cells, respectively and a pair of terminals mounted on the battery cover and connected to the cells; characterized in that at least one partition wall is provided in the battery cover to divide the battery cover into at least two vent chambers, each vent chamber overlying each set of the cells to prevent electrolyte from flowing from one of the two sets of the cells to the adjacent set of the cells when the battery is tilted and in that a common vent line provided in the battery cover connects the spaces above the cells for each set of the cells, each common vent line being sealed at one end and connected at the other end through the corresponding vent chamber to one end of the corresponding parallel vent line, each parallel vent line at the other end having a vent cap assembly which permits escape of vented gas from the cells of each set.

In the first and second features of the invention, the one end of the common vent line of each of the vent chambers may be sealed a vent stop extending through the battery cover into the vent hole in the first cell of each set of the cells.

The vent cap assembly may comprise a vent cap fitted to the other end of the parallel vent line and a gas filter fitted into the vent cap for allowing the vented gas to escape to the atmosphere. The vent cap on its outer periphery may have a helical path for passage of the vented gas and in communication with at least the end of the parallel vent line and the gas filter communicates with a downstream end of the helical path.

In addition to the helical path for passage of the vented gas, the vent cap further comprises a vent hole provided in an inlet side of the vent cap, a first vertical hole communicating with the vent hole and extending upwardly to the outer periphery of the vent cap to be connected at one end to one end of the helical path for passage of the vented gas, a second hole connected to the other end of the helical path and extending downwardly to the center of at an exit side of the vent cap so as to be in communication with the filter.

The gas filter may be preferably a water-repellant microporous gas filter. The microporous gas filter may have a grain size of about 270 microns. The gas filter fitted into the vent cap may be provided with a filter cover having a hole for escape of the vented gas.

In a preferred embodiment, each of the vent chambers may be provided with a chamber cover press fitted thereto and each of the vent chambers and the chamber cover may be heat-sealed to the battery cover.

Also, in a preferred embodiment, each of the side walls of the housing may be provided with a honey comb construction.

The present invention provides a multi-cell leak resistant automotive battery having a side/central gas venting arrangement wherein the central vent line in the battery cover is blocked in the middle corresponding to the middle partition of the battery container. This effectively creates two isolated battery compartments of cells. In a preferred embodiment, the battery may have six cells, with the three cells in each of the battery compartments.

Although the batteries with the side venting arrangement (which means a vent line provided along the long side and will be referred to as "vent line") exhibits leak resistant properties when they are rotated 90° on the front/back face or completely inverted due to an air-lock, such a construction is generally prone to acid leakage when they are rotated 90° along the side face in the direction of the side vent line. This acid leakage can be fully avoided by the present invention.

BRIEF DESCRIPTION OF THE DRAWINGS

The above and other objects and features of the invention will be apparent from the detailed description of the preferred embodiment of the invention, which is described and illustrated with reference to the accompanying drawings, in which.

DETAILED DESCRIPTION OF PREFERRED EMBODIMENTS

Figure 1:
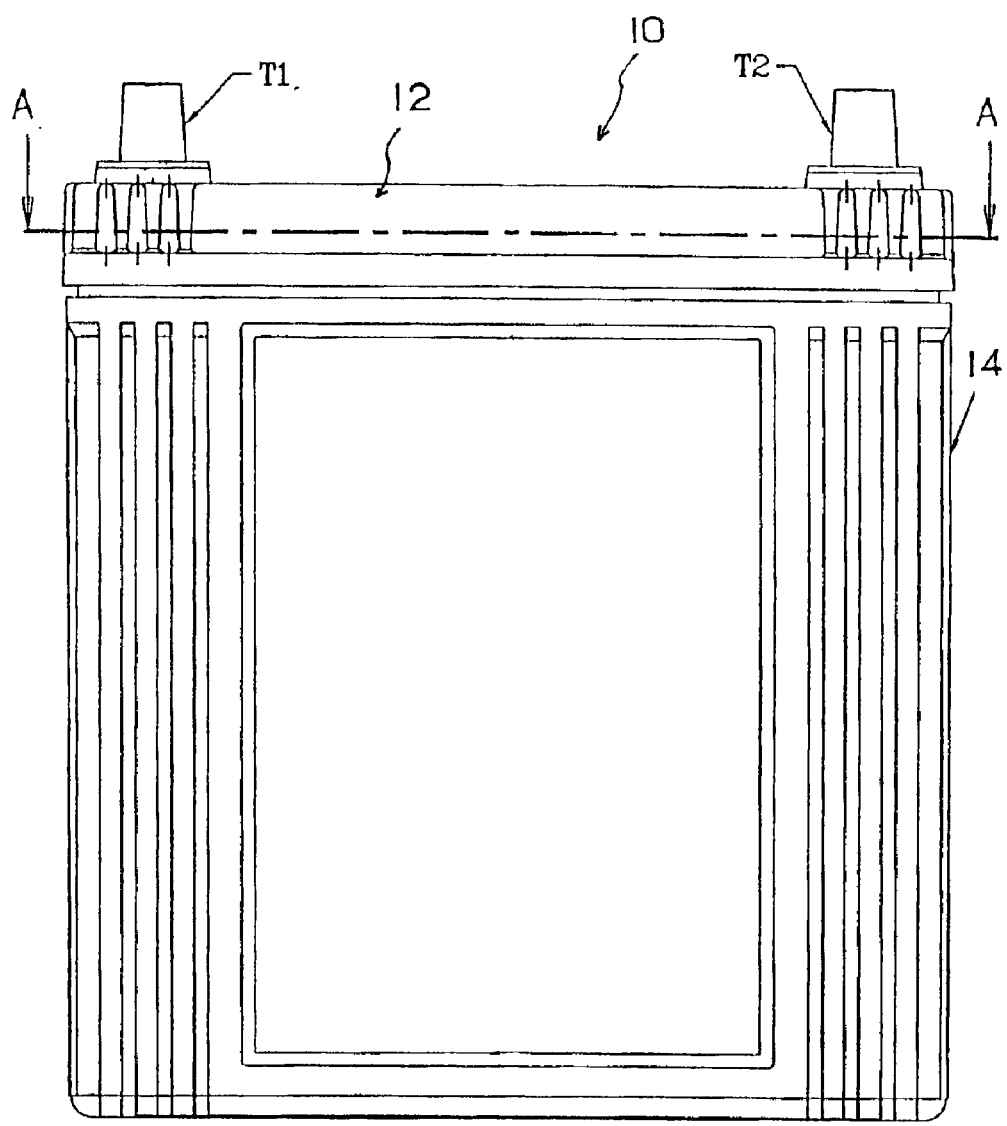
FIG. 1 is a front elevation view of an automotive battery according to the present invention.
Figure 2:
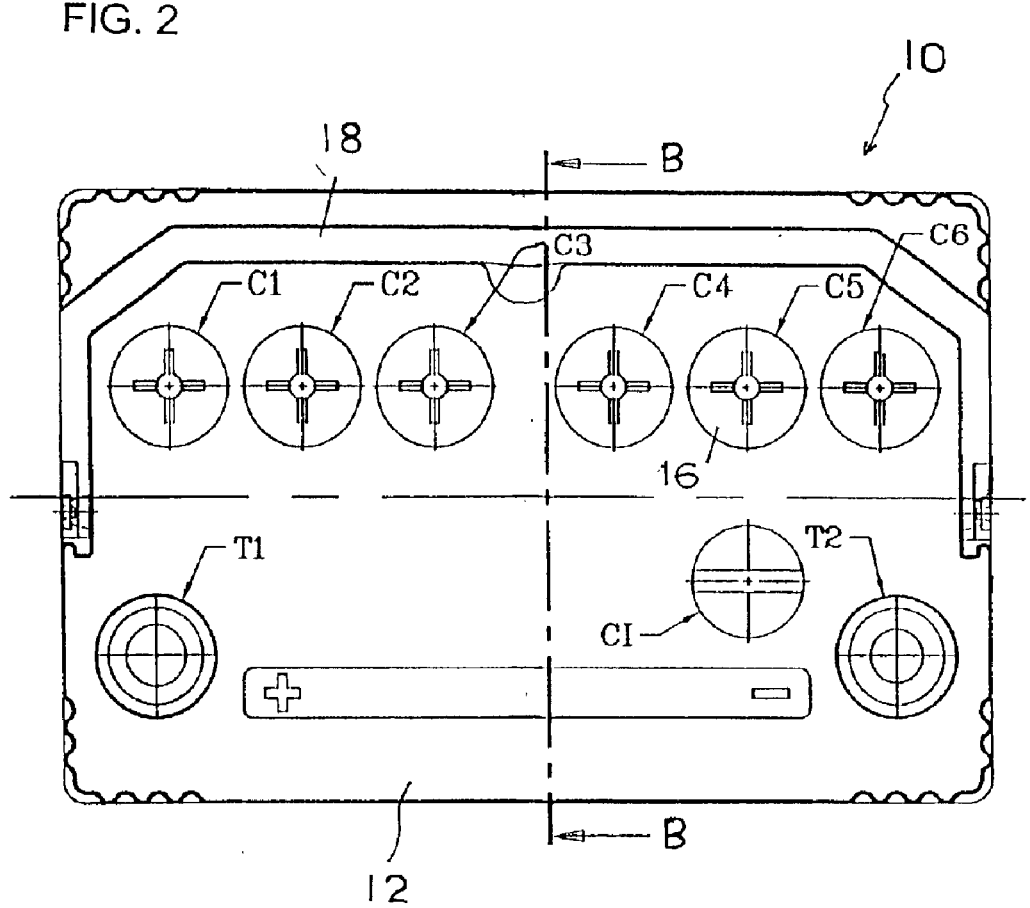
FIG. 2 is a plan view of the battery of FIG. 1.
Figure 3:
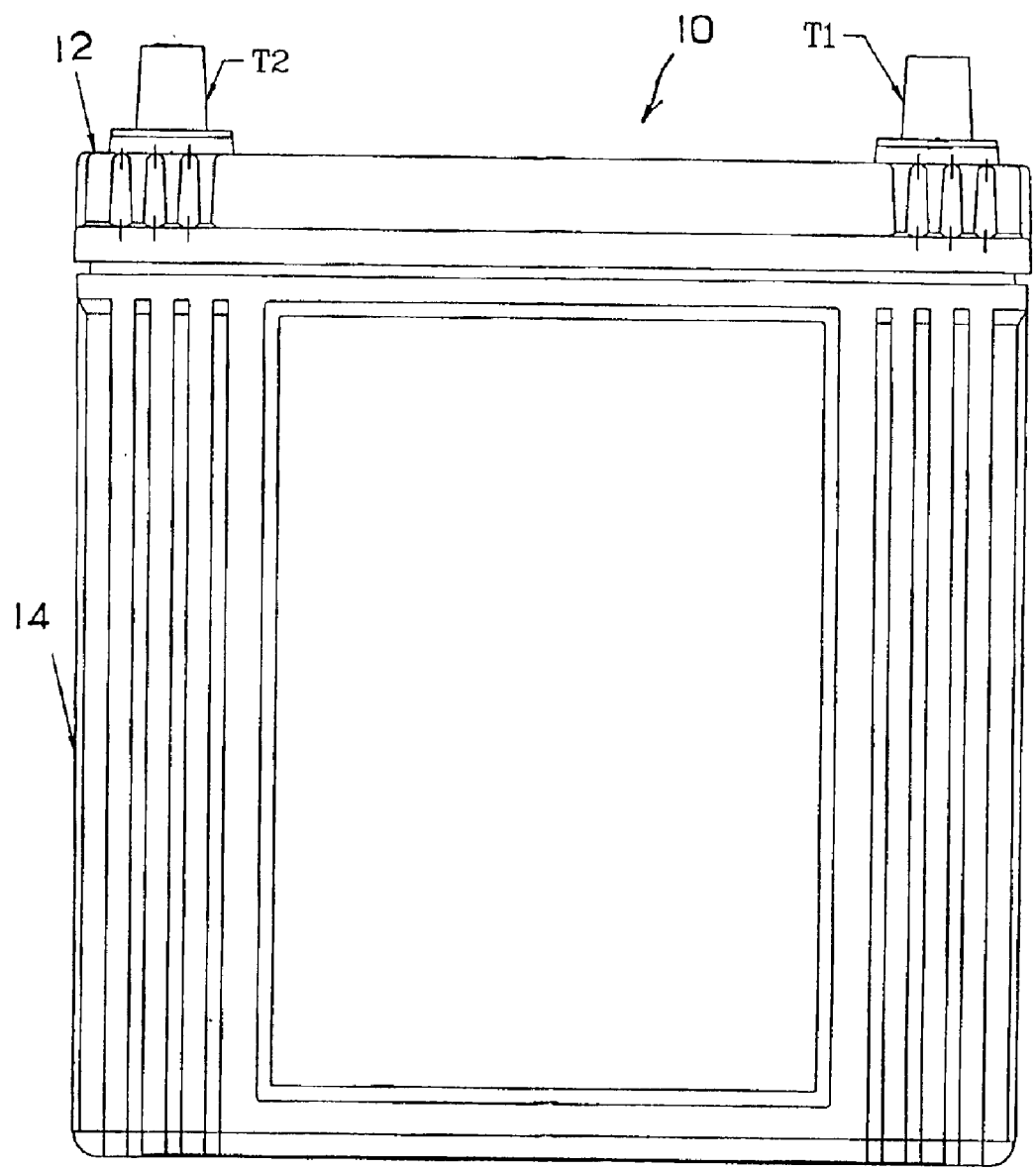
FIG. 3 is a rear view of the battery of FIG. 1.

The invention will now be described with reference to the accompanying drawings, which show a preferred embodiment of the invention. Referring now to FIGS. 1 and 2, there is shown a battery 10 constructed in accordance with one embodiment of the invention. The battery 10 comprises a housing 14 having a battery cover 12. Cells C1 through C6 are contained in the housing 14.

Each of the cells is provided with a filling plug 16. The filling plugs 16 are not provided with any venting holes and are fitted in the battery cover 12 in a liquid and air tight manner by means of "O" ring seals. The filling plugs 16 may be flush with the top surface of the battery cover 12. These filling plugs are closed after electrolyte is filled in the battery. Optionally, as shown in FIG. 2, a sunk-in lifting handle 18 may be provided so as to be flush with the battery cover 12. A charge indicator C1 may be provided on the battery cover 12.

Figure 4:
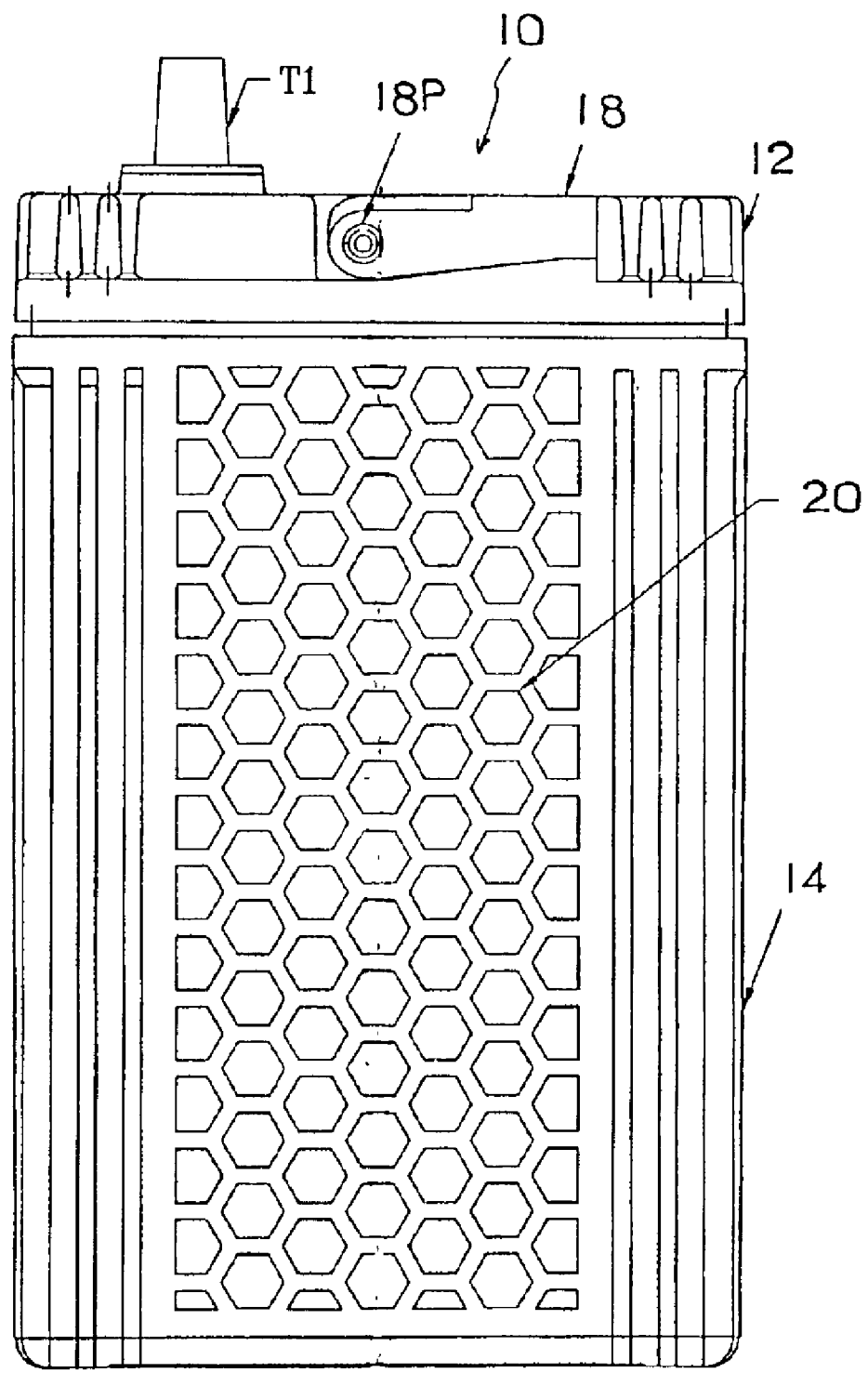
FIG. 4 is a side elevational view of the battery of FIG. 1.

As noted from FIG. 4, each of side walls of the housing 14 may be provided with a honey comb structure generally indicated by a numeral 20. This is an optional feature. Such honeycomb structure of the side wall or walls prevent the housing 14 from bulging. FIG. 4 shows a hinge 18P on which a handle 18 may be hinged to be operable.

Figure 5:
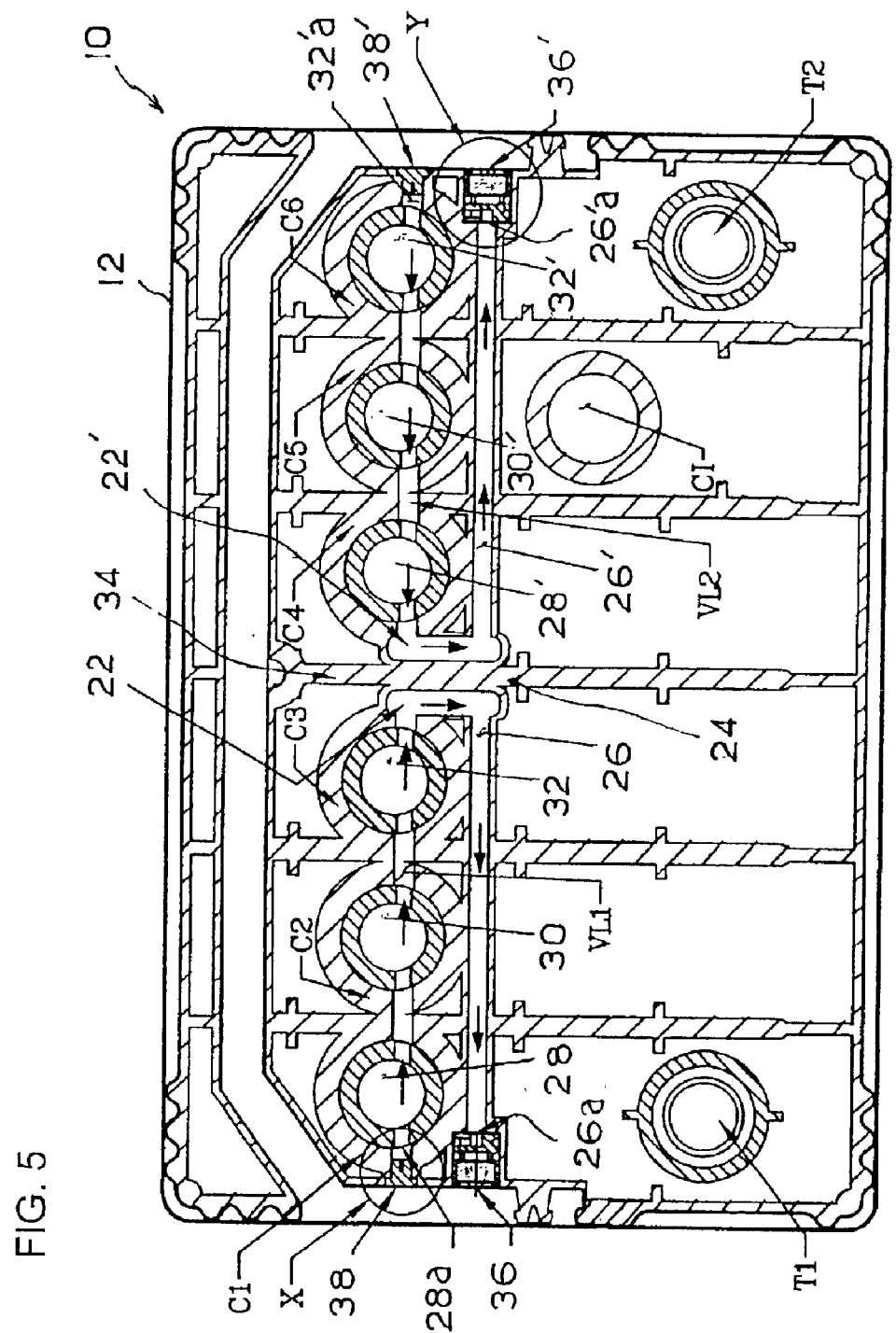
FIG. 5 is a cross sectional view of the battery taken along line A—A in FIG. 1.

FIG. 5 shows a top cross section of the battery 10 of the invention. Some of the features of the invention are shown in this figure as well as in FIGS. 6 and 7.

The features of the invention lie in vent line blockage means 24 to divide the battery cover 12 into at least two vent chambers 22 and 22' corresponding to at least two sets of the cells so as to prevent electrolyte from flowing from one of the sets of the cells C1 through C3 to the other set of cells C4 through C6 when the battery 10 is tilted, common vent lines VL1 and VL2 provided in the battery cover 12 to connect upper spaces of the corresponding cells for each set of the cells and parallel vent lines 26 and 26' provided in the battery cover 12 corresponding to each set of the cells separately from the common vent lines VL1 and VL2.

As shown in FIG. 5, the battery cover 12 has filling holes 28, 30, 32 and 28', 30', 32' corresponding to the filling plugs 16 of the cells C1 through C6, respectively. The vent line blockage means 24 may comprise a central blockage wall 34 provided to block the common/side vent lines VL1 and VL2 extending through the filling holes (vent holes) 28, 30, 32 and 28', 30', 32' in the battery cover 12 to form the vent chambers 22 and 22'. Thus, one VL1 of the vent lines connecting the filling holes 28, 30 and 32 to each other is separated by the central blockage wall 34 from the other vent line VL2 connecting the filling holes 28', 30' and 32' to each other. The gas from each set of the cells reaches the side vent lines VL1 and VL2, respectively through filling holes corresponding to the filling plugs 16.

The two common vent lines VL1 and VL2 are connected to corresponding parallel vent lines 26 and 26', respectively. More particularly, the one parallel vent line 26 on one side is connected to the vent chamber 22 formed by the common vent line VL1 connecting the filling holes 28, 30 and 32 of the cell C1 through C3 and the other parallel vent line 26' on one side is connected to the vent chamber 22' formed by the common vent line VL2 connecting the filling holes 28', 30' and 32' of the cell C4 through CG. Each of the parallel vent lines 26 and 26' at their other ends 26a and 26'a have cylindrical holes 40 and 40' provided with vent cap assemblies 36 and 36', respectively.

Figure 6:
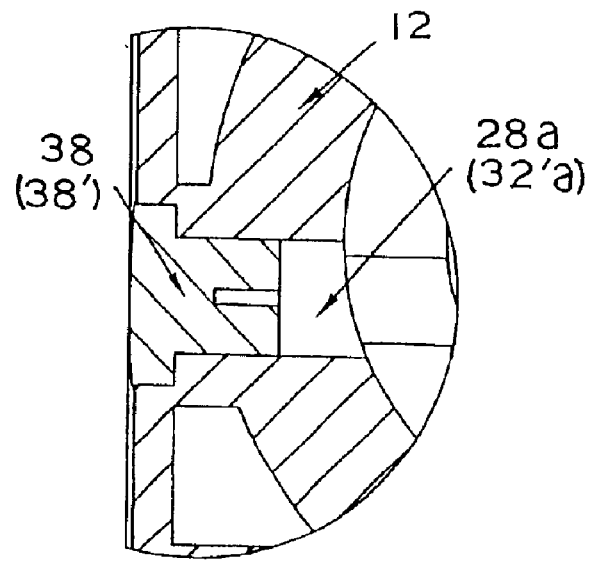
FIG. 6 is an enlarged detailed view of the circled portion X marked in FIG. 5.
Figure 7:
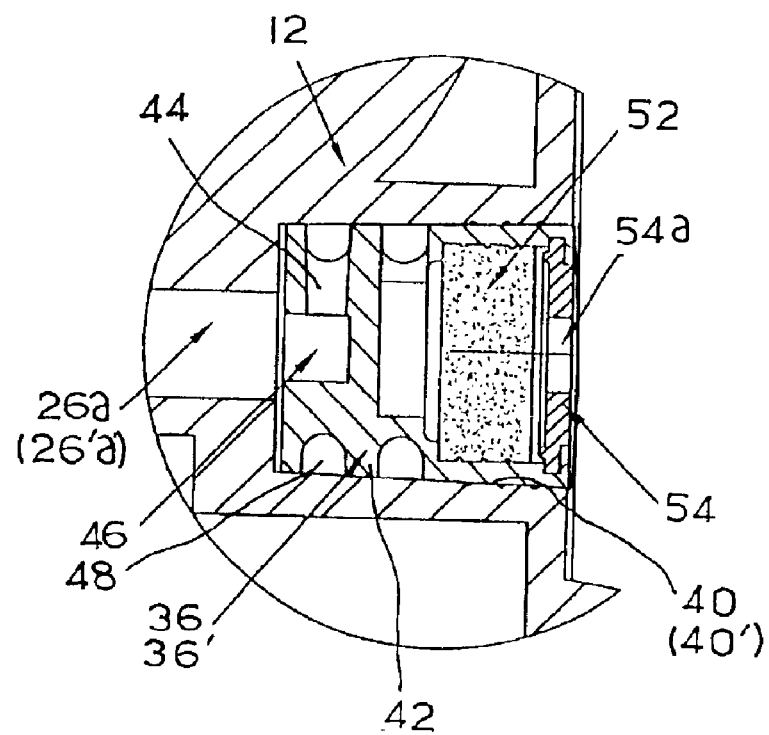
FIG. 7 is an enlarged view of the circled portion Y marked in FIG. 5

FIG. 6 shows how the end 28a of the vent hole 28 overlying the cell C1 is closed by a vent stop 38 extending into the battery cover 12. A similar vent stop 38' is provided also on the end 32'a of the vent hole 32' overlying the cell C6. This causes the vent lines VL1 and VL2 to be sealed on their one side and to be connected to the parallel vent lines 26 and 26' on their other side, respectively.

Figure 8:
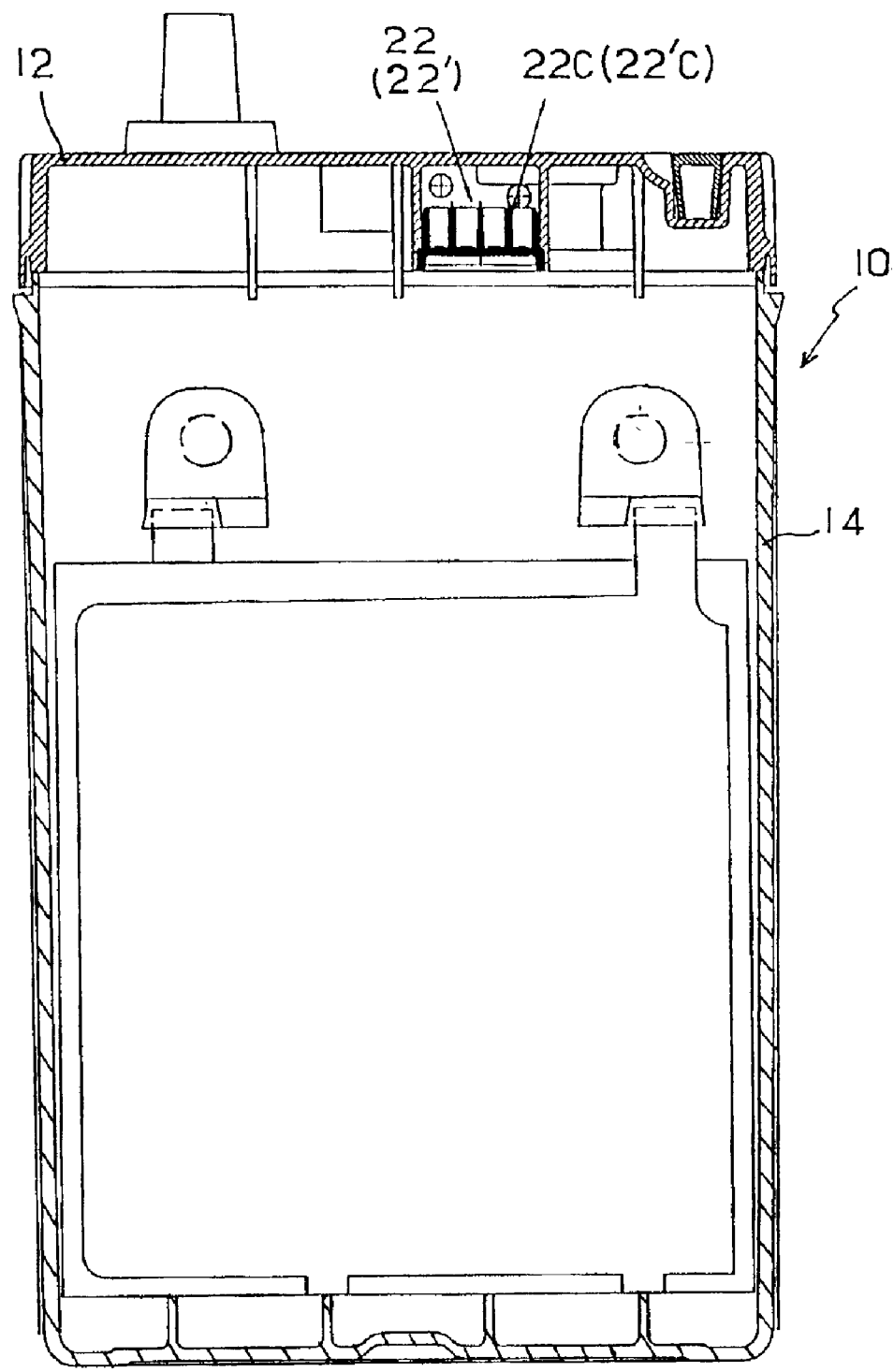
FIG. 8 is a cross sectional view of the battery taken along line B—B in FIG. 2.
Figure 9:
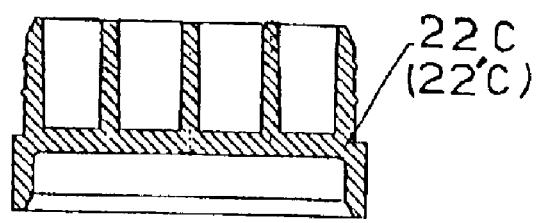
FIG. 9 is an enlarged cross sectional view of the chamber cover shown in FIG. 8.
Figure 10:
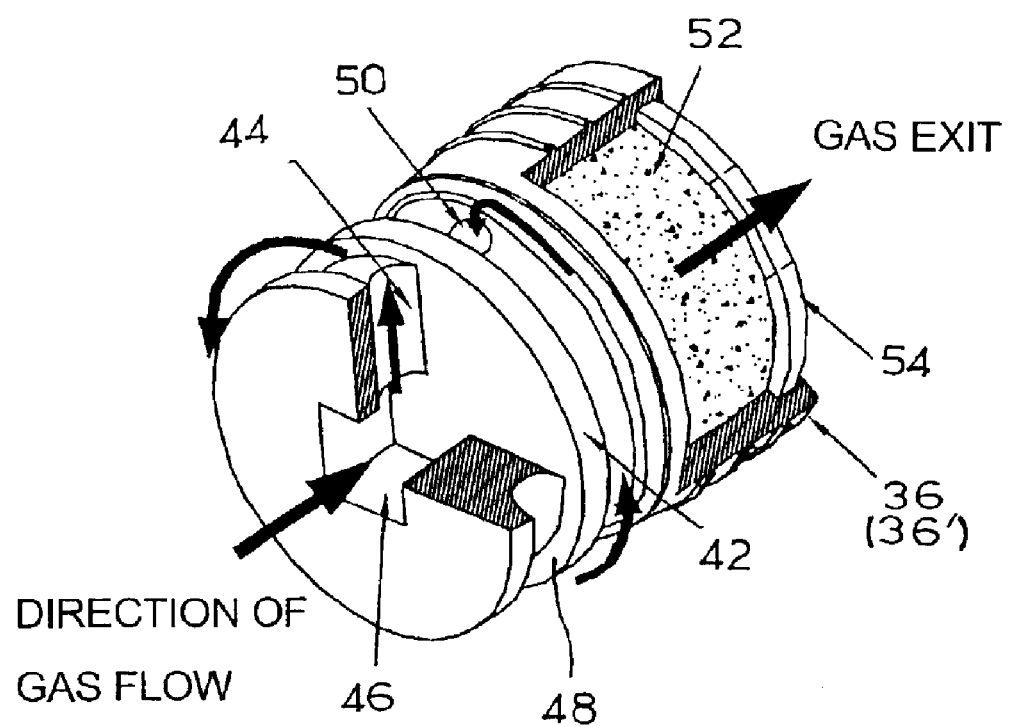
FIG. 10 is an enlarged perspective view of the vent cap assembly used in the battery of the invention.
Figure 11:
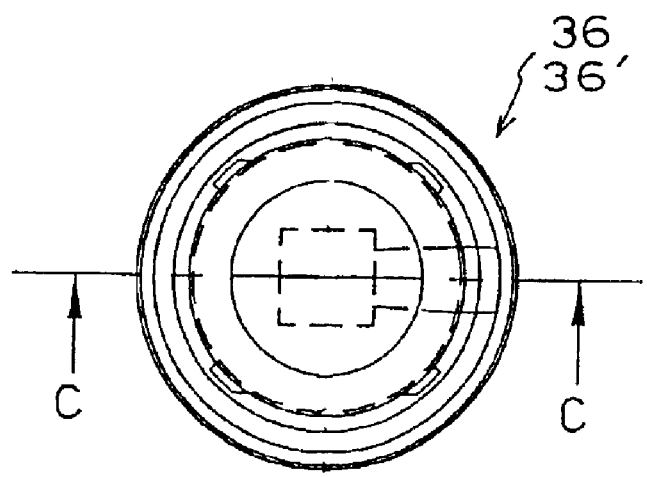
FIG. 11 is a side elevational view of the vent cap assembly of FIG. 10.
Figure 12:
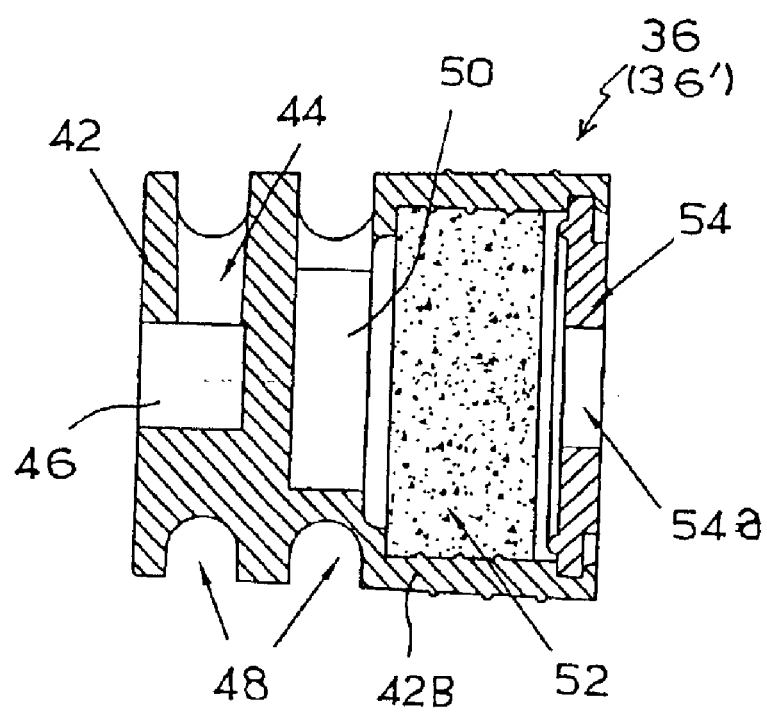
FIG. 12 is a cross sectional view of the vent cap assembly taken along line C—C in FIG. 11.

The vent chambers 22 and 22' formed over the two sets of the cells C1–C3 and C4–C6, respectively are shown in FIG. 8 and are provided with chamber covers 22C and 22'C, respectively as shown in more details in FIG. 9. Both of the vent chambers 22 and 22' and the chamber covers 22C and 22'C are heat-sealed on the underside of the battery cover 12 and therefore, a closed loop for the gas/electrolyte within each set of the cells C1–C3 or C4–C6.

Vent cap assemblies 36 and 36' for venting the vent chambers 22 and 22' over the two sets of the cells C1–C3 and C4–C6 will now be described with reference to FIG. 7, FIGS. 10 through 12.

As already described, the parallel vent lines 26 and 26' have the one end connected to the common vent lines VL1 and VL2, respectively. The parallel vent lines 26 and 26' at their other ends have cylindrical holes 40 and 40', respectively, in which the vent cap assemblies are fitted, respectively.

The vent cap assemblies 36 and 36' (FIG. 10) comprise a vent cap 42 fitted into the cylindrical holes 40 and 40' provided in the other ends of the parallel vent lines 26 and 26'. The vent cap 42 may be preferably push-fitted into the cylindrical holes 40 and 40'.

The vent cap 42 at its inlet end has a vent hole 46 in communication with a first vertical hole 44 extending upwardly to the outer periphery of the vent cap 42. A helical path 48 is provided on the outer periphery of the vent cap 42. At one end of the helical path 48 is connected the first vertical hole 44 and at the other end of the helical path 48, a second vertical hole 50 extends downwardly into the center of the vent cap 42.

A water-repellant microporous gas filter 52 is provided at the outlet end of the vent cap 42 to communicate with the second vertical hole 50. At the end of the filter 52 remote from the vent cap 42, there may be provided a filter cover 54 having a hole 54a (FIG. 12) for escape of the vented gas which exits through the hole 54a and is filtered by the gas filter 52. The filter cover 54 serves to lock the gas filter 52 to the body 42B of the vent cap 42.

When any gas is vented through the parallel vent line 26 or 26', it exits through the cylindrical hole 40 or 40' in the vent line 26 or 26' to the vent cap 42. The vented gas then traverses vertically up through the first vertical hole 44, moves along the helical path 48 and then descends downwardly to the center of the vent cap 42 before coming into contact with the gas filter 52 as diagrammatically shown in FIG. 10. The gas permeated through the gas filter 52 exits through the opening 54a in the filter cover 54. The filter cover 54 may be preferably a plastic cover. Thus, it will be noted that the gas filter is prevented from coming into contact with any dust on the exposed outer surface of the parallel vent line 26 or 26'.

The common vent lines VL1 and VL2 extending over the cells C1–C3 and C4–C6 are closed at one end by means of vent stops 38 and 38', respectively. However, for escape of the gases, there are the parallel vent lines 26 and 26' at one end connected to the common vent lines VL1 and VL2, respectively and at the other end closed. The parallel vent lines 26 and 26' are provided in the battery cover 12 to connect the vent chambers 22 and 22' to the cylindrical holes 40 and 40' at the exit end of the parallel vent lines 26and 26', respectively. The specially designed vent cap assemblies 36 and 36' are push-fitted into the cylindrical openings and have the water-repellant microporous gas filter 52. The filter cover 54 is locked into the vent cap 42. Thus, the need for additional heat sealing or ultrasonic sealing operation can be dispensed with.

The vent chambers 22 and 22' of the respective set of the cells have the chamber cover 22C and 22'C, respectively, which are press-fitted thereto and then heat-sealed on the underside of the battery cover 12. Thus, it will be noted that no separate heat-sealing operation is required. It will be also noted that both of the vent chambers 22 and 22' and the chamber covers 22C and 22'C can be heat-sealed along the battery cover in a single heat-sealing operation.

Figure 13:
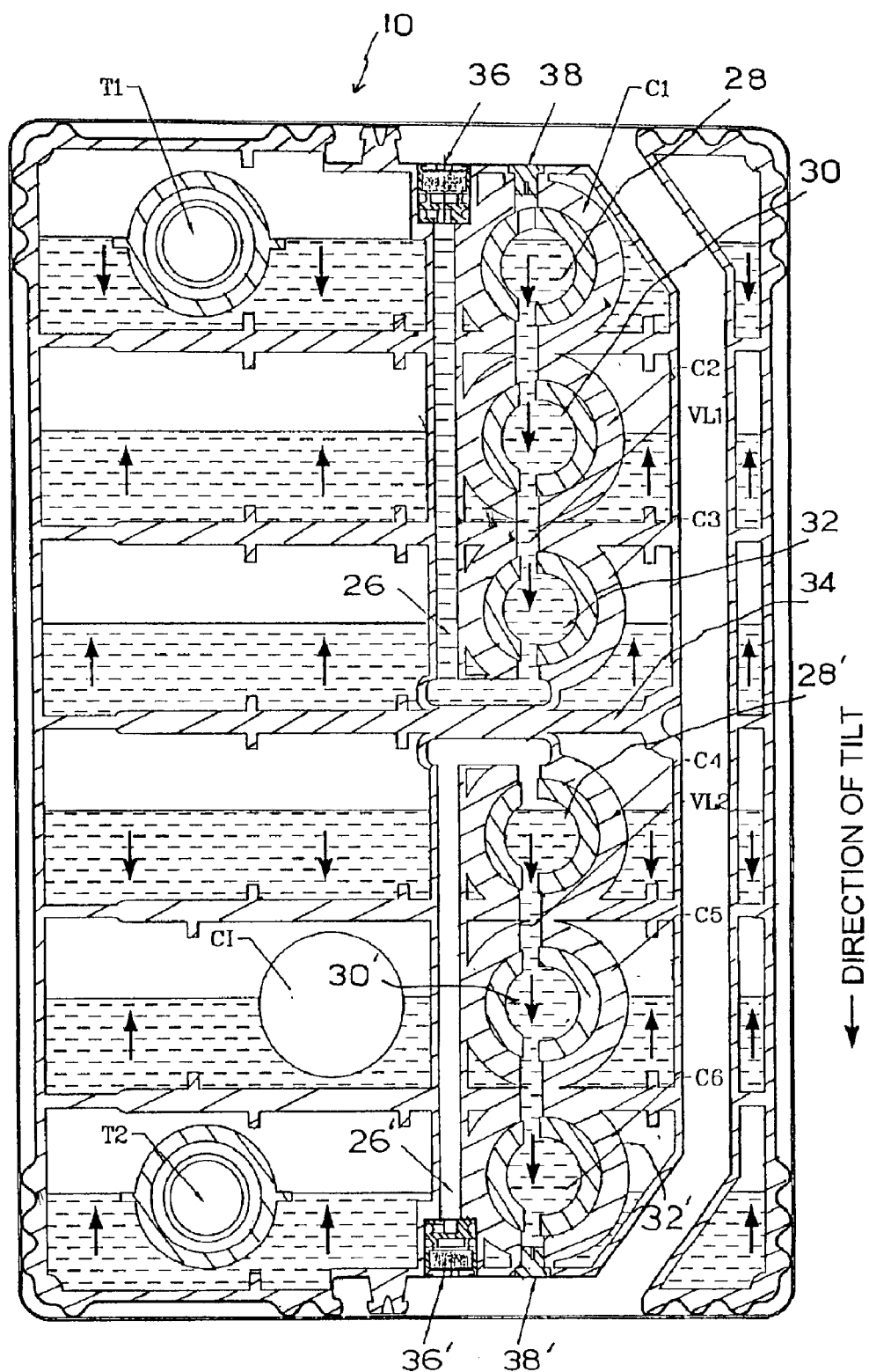
FIG. 13 is a horizontal cross sectional view showing a movement of electrolyte when there is tilted at 90° the battery so that it rides on the shorter side thereof.

FIG. 1 shows the battery according to the invention in the upright position. In FIG. 13, the battery 10 is shown to be tilted by 90° to lie on one of the shorter sides thereof. In this position, the electrolyte in each set of three cells compartments C1–C3 or C4–C6 moves downwardly to leave the chambers empty. Thus, since the parallel vent lines 26 and 26' and the vent chambers 22 and 22' are connected to the corresponding empty chambers. There is no possibility of acid leakage through the vent cap 42.

Further, the central blockage of the common vent lines VL1 and VL2 by the partition wall 34 prevents transfer of the electrolyte from the upper set of the cells C1–C3 to the lower set of the cells C4–C6. As a result, with the battery 1 located in the position shown in FIG. 13, when the battery 10 is brought back to the original upright position shown in FIG. 1, there is only a negligible cell-to-cell variation in the levels of the electrolyte.

Thus, it will be noted that there is a substantial improvement in minimizing the cell-to-cell variation in the levels of the electrolyte even after tilting the battery 90° to lie on one of the shorter sides thereof, as compared with the conventional side-vented batteries having the common vent line through the battery cover. In fact, in the conventional battery, a significant variation in the cell-to-cell electrolyte levels does occur due to appreciable transfer of the electrolyte from the upper side cells to the lower side cells when the battery is lying on the shorter side thereof.

Figure 14:
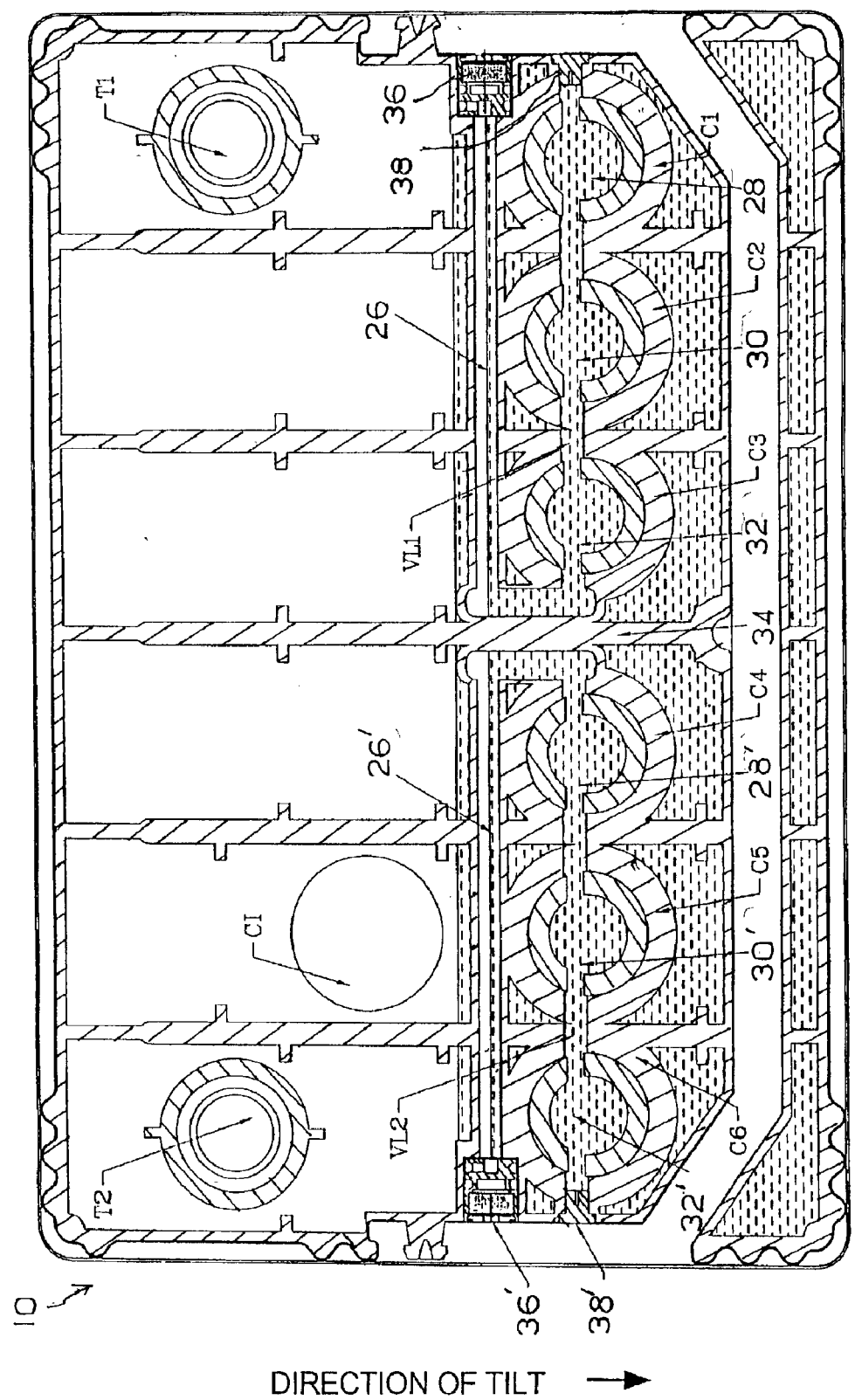
FIG. 14 is a horizontal cross sectional view showing a movement of electrolyte when there is tilted at 90° the battery so that it rides on the back face thereof.

In FIG. 14, the battery 10 is shown to be lying on the back side thereof by tilting the battery 10 in the direction as indicated by the arrow in FIG. 14. In this position, the parallel vent lines 26 and 26' barely covered with the electrolyte. However, hydraulic pressure in this position of the battery is too small for the electrolyte to traverse vertically upwards to break the resistance to the flow of the electrolyte through the vent cap 42 and the gas filter 52. As a result, it will be noted that no leakage of the electrolyte occurs in this position of the battery for several hours. Furthermore, due to the air lock, after the battery is tilted to lie on the back side, on the front side or in the inverted position, it is confirmed that there is the resistance to the electrolyte leakage for a considerable length of time.

Figure 15:
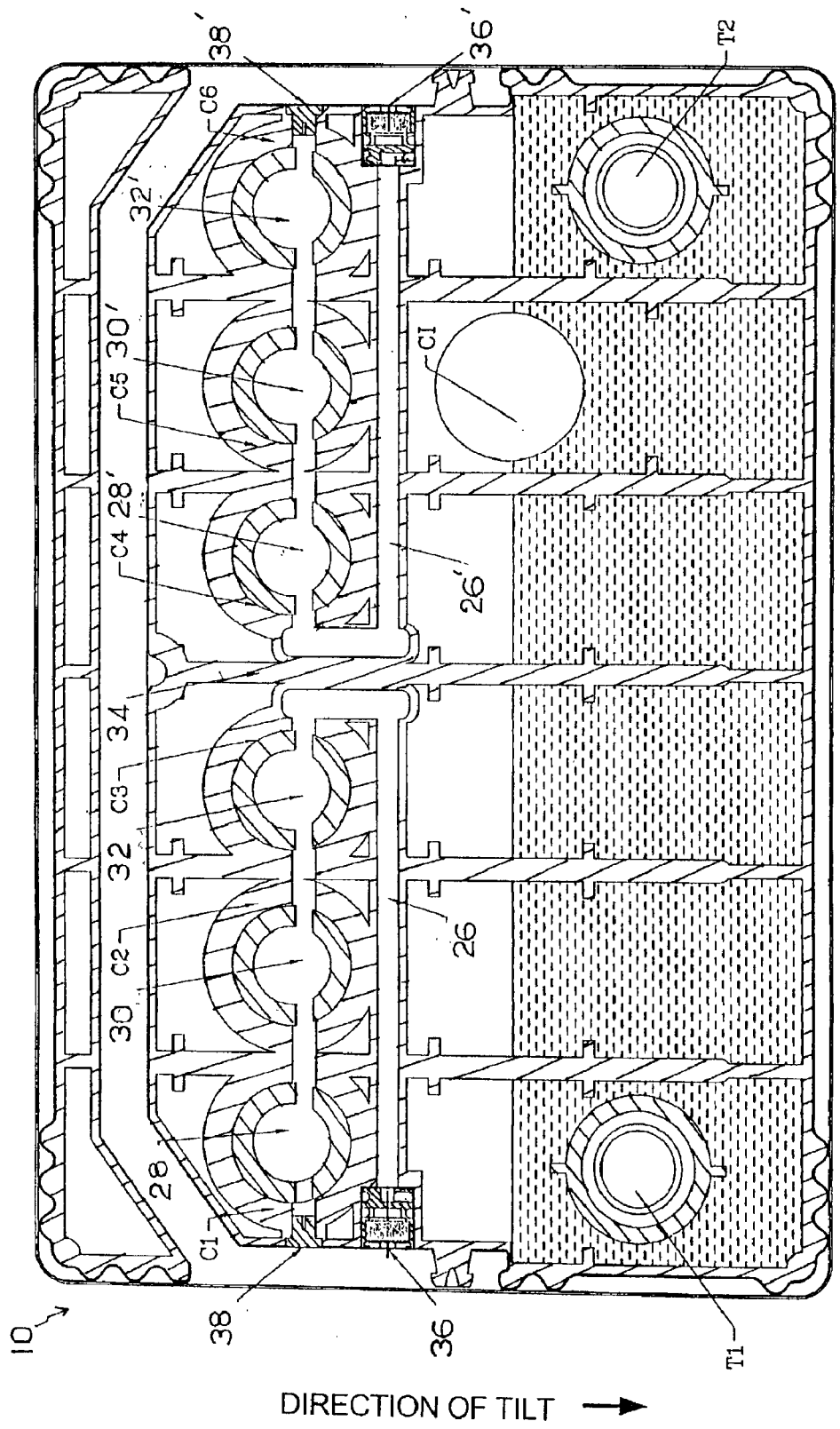
FIG. 15 s is a horizontal cross sectional view showing a movement of electrolyte when there is tilted at 90° the battery so that it rides on the front face thereof.

FIG. 15 shows the battery 10 lying on the front side thereof. Similarly, in this position, it can be seen that the maximum electrolyte level is below the parallel vent lines 26 and 26'. Thus, it will be noted that there is no possibility of the electrolyte leakage when the battery it tilted to this position.

In the inverted position of the battery 10, the air lock develops. This prevents the leakage of the electrolyte through the vent cap 42 and the gas filter 52. Thus, it will be also confirmed that in this inverted position, no electrolyte leakage also occurs for several hours.

In the present invention, the gas filter 52 may be preferably the water-repellant microporous filter having a grain size of approximately 270 microns. This is made of plastic alloy and treated to exhibit water-repellant characteristics. This can achieve the substantial resistance to leakage of the electrolyte through the vent hole.

It will be understood from the foregoing that the present invention provides a highly leak resistant battery in all directions. More important, this feature of the invention has been achieved in a relatively simple manner and in a cost effective manner.

Furthermore, in accordance with the invention, most of the electrolyte is retained in their respective cells during the battery rotation or tilt while in most other leak resistant designs, a substantial amount of electrolyte is allowed to flow out of the cell in the space available between the lower and upper lids of the battery cover.

Also, in the conventional side/central gas venting design, the substantial transfer of the electrolyte takes place from the upper side cells to the lower side cells when the battery is rotated up to 90° along the side face thereof.

On the other hand, the battery according to the present invention advantageously has the resistance to the electrolyte leakage in all the directions for a considerable length of time when it is tilted on its front or back face or either of its sides or completely inverted starting from the originally upright position.

Although one preferred embodiment of the invention has been described and illustrated with reference to the accompanying drawings, it will be understood by those skilled in the art that it is by way of example, and that various changes and modifications may be made without departing from the spirit and scope of the invention, which is d only to the appended claims.

What is claimed is:

1. A leak resistant automotive battery comprising a housing containing cells each having a filling plug, a battery cover fitted to said housing at its opened top in a liquid tight manner and having filling holes overlying said cells, respectively and a pair of terminals mounted on the battery cover and connected to said cells; characterized by further comprising vent line blockage means to divide said battery cover into at least two vent chambers corresponding to two sets of said cells so that electrolyte is prevented from flowing from one of said sets of said cells to the other set of said cells when said battery is tilted; a common vent line provided in said battery cover to connect the spaces above said cells for each sets of said cells to each other for every set of said cells, and a parallel vent line provided in said battery cover for each of said sets of cells separately from said common vent line, one end of said common vent line being closed while the other end of said common vent line is connected through said corresponding vent chamber to one end of said parallel vent line and said parallel vent line at the other end having a vent cap assembly to permit escape of vented gas from said cells of each set.

2. A leak resistant automotive battery as set forth in claim 1 and wherein said common vent line in each vent chamber is sealed at said one end by means of a vent stop extending through said battery cover into said vent hole of the first cell of each set.

3. A leak resistant automotive battery as set forth in claim 1 and wherein said vent cap assembly comprises a vent cap fitted to said other end of said parallel vent line and a gas filter provided in said vent cap for allowing the vent gas to escape.

4. A leak resistant automotive battery as set forth in claim 1 and wherein said vent cap assembly comprises a vent cap fitted to said other end of said parallel vent line and a gas filter provided in said vent cap for allowing the vent gas to escape and wherein said vent cap on its outer periphery has a helical path in communication with said other end of said parallel vent line, said gas filter communicating with a downstream side of said helical path.

5. A leak resistant automotive battery as set forth in claim 4 wherein said vent cap further comprises a vent hole provided on an inlet side thereof and connected to said other end of said parallel vent line, a first vertical hole extending from said vent hole upwardly to the inlet side of said helical path and a second vertical hole extending downwardly to a cap center at the exit side of said vent cap so as to connect an outlet end of said helical path and said gas filter.

6. A leak resistant automotive battery as set forth in claim 4 wherein said gas filter is a water-repellant microporous gas filter.

7. A leak resistant automotive battery as set forth in claim 4 wherein said gas filter is a water-repellant microporous gas filter having a grain size of about 270 microns.

8. A leak resistant automotive battery as set forth in claim 4 wherein said gas filter provided in said vent cap is covered by means of a filter cover having a hole for escape of the vented gas.

9. A leak resistant automotive battery as set forth in claim 1 wherein each of said vent chambers is provided with a chamber cover press-fitted thereto, said vent chamber and said chamber cover being sealed to said battery cover.

10. A leak resistant automotive battery as set forth in claim 1 wherein said housing includes side walls and has a honeycomb structure provided on the side walls.

11. A leak resistant automotive battery comprising a housing containing cells each having a filling plug, a battery cover heat-sealed to an opened top end of said housing and having filling holes overlying said cells, respectively and a pair of terminals mounted on said battery cover and connected to said cells; characterized in that at least one partition wall is provided in said battery cover to divide said battery cover into at least two vent chambers, each vent chamber overlying a set of said cells to prevent electrolyte from flowing from one of said sets of said cells to the adjacent set of said cells when said battery is tilted and in that a common vent line provided in said battery cover connects the spaces above said cells for each set of said cells, each common vent line being sealed at one end and connected at the other end through the corresponding vent chamber to one end of the corresponding parallel vent line, each parallel vent line at the other end having a vent cap assembly which permits escape of vented gas from said cells of each set.

12. A leak resistant automotive battery as set forth in claim 11 and wherein said vent cap assembly comprises a vent cap fitted to said other end of said parallel vent line and a gas filter provided in said vent cap for allowing the vent gas to escape.

13. A leak resistant automotive battery as set forth in claim 11 and wherein said vent cap assembly comprises a vent cap fitted to said other end of said parallel vent line and a gas filter provided in said vent cap for allowing the vent gas to escape and wherein said vent cap on its outer periphery has a helical path in communication with said other end of said parallel vent line, said gas filter communicating with a downstream side of said helical path.

14. A leak resistant automotive battery as set forth in claim 11 and wherein said common vent line in each vent chamber is sealed at said one end by means of a vent stop extending through said battery cover into said vent hole of the first cell of each set.

15. A leak resistant automotive battery as set forth in claim 13 wherein said vent cap further comprises a vent hole provided on an inlet side thereof and connected to said other end of said parallel vent line, a first vertical hole extending from said vent hole upwardly to the inlet side of said helical path and a second vertical hole extending downwardly to a cap center at an exit side of said vent cap so as to connected the outlet end of said helical path and said gas filter.

16. A leak resistant automotive battery as set forth in claim 13 wherein said gas filter is a water-repellant microporous gas filter.

17. A leak resistant automotive battery as set forth in claim 13 wherein said gas filter is a water-repellant microporous gas filter having a grain size of about 270 microns.

18. A leak resistant automotive battery as set forth in claim 13 wherein said gas filter provided in said vent cap is covered by means of a filter cover having a hole for escape of the vented gas.

19. A leak resistant automotive battery as set forth in claim 11 wherein each of said vent chambers is provided with a chamber cover press-fitted thereto, said vent chamber and said chamber cover being sealed to said battery cover.

20. A leak resistant automotive battery as set forth in claim 11 wherein housing includes side walls and has a honeycomb structure provided on the side walls.

* * * * *